UNITED STATES PATENT OFFICE.

PHILIP L. WOOSTER, OF YONKERS, NEW YORK.

PROCESS FOR PURIFYING SUGAR JUICES OR SYRUPS.

1,304,438.            Specification of Letters Patent.      Patented May 20, 1919.

No Drawing.       Application filed January 17, 1916. Serial No. 72,490.

*To all whom it may concern:*

Be it known that I, PHILIP L. WOOSTER, a citizen of the United States, and resident of Yonkers, Westchester county, New York, have made a certain new and useful Invention Relating to Process for Purifying Sugar Juices or Syrups, of which the following is a specification.

My invention relates to the manufacture of sugar and has for its object the simplification and the rendering more efficient of the processes of purification of the sugar juices or liquors.

Heretofore in the production of sugar it has been considered essential that the raw juices or liquor should be purified by a process of defecation by the use of lime or similar salts to which in most cases acid of various kinds is added. The function of the lime has been to cause the coagulation of the mechanical impurities and albumens, gums and pectins found in the raw juice or syrups and the acid has been added to combine with the lime remaining in the liquor. The use of lime in the defecation process referred to has caused the impurities to more or less separate from the liquor and either to float on the top or precipitate to the bottom. The impurities are then removed and the liquor is continued in the process of purification for the final production of the sugar.

I have discovered that in spite of the universal practice a proper purification of the raw sugar or liquor can be had without the use of lime or acid, and indeed that by omitting lime several disadvantages will be done away with and the purification process rendered much more effective.

My process can be used satisfactorily either in the purification of the raw juice on the plantation or in the refining of the sugars in the factory. The raw juice or liquor may either be treated cold or hot. The crude juice as it comes from the mills or the raw sugar as it is received at the refinery and melted is, in my process, mixed with a small quantity of kieselguhr or similar suitable filtering medium and is then passed directly to a filter press or other suitable filter. The kieselguhr or other similar medium forms a filtering surface in the interstices of the filter cloth or backing and the mechanical impurities and the albumen and other substances above referred to are mechanically held in the filtering material.

Where lime is used either with or without kieselguhr in the ordinary process of defecation, the lime products tend to clog and slime the filters and delay the filtering process. By my process the filtering action proceeds much more rapidly than where lime has been used and the product is even more free from impurities than where lime has been used. Owing to the fact that some of the lime products are soluble in the sugar solution and pass through the filter element with the liquor, the crystallization of sucrose from the impure solution that has been subjected to defecation with lime is interfered with and a less percentage of sugar can be recovered from a given quantity of raw material when lime has been used, as compared with purification by my process. Furthermore where lime is used in the defecation process the resultant liquor is darkened in color and the clarification and decoloration of such product must necessarily be continued for a greater length of time and through a greater extent of filters than with the liquor treated by my process, which is not darkened in color. There are other disadvantages connected with the use of lime and of acid which will suggest themselves to those familiar with the art, and which are eliminated by the use of my process by which I can produce a larger output of sugar from a given quantity of raw material than was possible by the old processes. Furthermore it is to be noted that inasmuch as in my process the kieselguhr or other filtering medium is not combined with lime or other injurious substances it can be revivified by application of heat and reused from time to time as desired, which would not be possible if lime or similar salts were used.

The effectiveness of my process is demonstrated by the fact that whereas the residual molasses, commonly known as black-strap, resulting from the repeated boiling of molasses until it has reached a point where it can no longer be profitably treated by the ordinary processes for the extraction of sugar is sold by the mills and refineries for other purposes, such residual molasses can profitably be further treated by my process and considerable percentages of sugar commercially extracted therefrom at commercial cost.

I do not intend, of course, to be limited to the details of the process above set forth, which may be varied without departing from the spirit of my invention. What I claim and desire to cover by Letters Patent is set forth in the following claims.

1. The process of purifying raw sugar material which consists in adding to said material a small proportion of earthy filtering material and without the addition of lime passing the mixture through a filter.

2. The process of purifying raw sugar material which consists in adding to said material a small proportion of kieselguhr and without the addition of lime, passing the mixture through a suitable filter.

3. The process of purifying raw sugar material which consists in adding to said material a small proportion of earthy filtering material and without the addition of lime or acid passing the mixture through a filter.

4. The process of purifying raw sugar material which consists in adding to said material a small proportion of earthy filtering material and without the addition of a chemical reagent passing the mixture through a filter.

5. The process of purifying raw sugar material which consists in adding to said material a small proportion of earthy filtering material and without the addition of lime or acid passing said mixture through a filter press.

PHILIP L. WOOSTER.